United States Patent
Hou (10) Patent No.: US 11,468,191 B2
(45) Date of Patent: Oct. 11, 2022

(54) METHOD AND APPARATUS FOR IDENTIFYING APPLETS OF RISKY CONTENT BASED ON DIFFERENTIAL PRIVACY PRESERVING

(71) Applicant: Alipay (Hangzhou) Information Technology Co., Ltd., Zhejiang (CN)

(72) Inventor: Huichao Hou, Zhejiang (CN)

(73) Assignee: Alipay (Hangzhou) Information Technology Co., Ltd., Zhejiang (CN)

( * ) Notice: Subject to any disclaimer, the term of this patent is extended or adjusted under 35 U.S.C. 154(b) by 0 days.

(21) Appl. No.: 17/338,005

(22) Filed: Jun. 3, 2021

(65) Prior Publication Data
US 2022/0092213 A1 Mar. 24, 2022

(30) Foreign Application Priority Data
Sep. 18, 2020 (CN) .......................... 202010988095.8

(51) Int. Cl.
*G06F 21/62* (2013.01)
*G06F 21/57* (2013.01)

(52) U.S. Cl.
CPC ........ *G06F 21/6245* (2013.01); *G06F 21/577* (2013.01)

(58) Field of Classification Search
CPC ............................ G06F 21/6245; G06F 21/577
See application file for complete search history.

(56) References Cited

U.S. PATENT DOCUMENTS

| 9,521,164 | B1 * | 12/2016 | Angiolelli | ........... H04L 63/1483 |
| 2017/0098100 | A1 | 4/2017 | Yadgiri et al. | |
| 2018/0349638 | A1 * | 12/2018 | Barraclough | ......... H04L 9/3239 |
| 2020/0349288 | A1 * | 11/2020 | Jun | ..................... G06F 21/6245 |

OTHER PUBLICATIONS

Liu et al., "What You See Isn't Always What You Get: A Measurement Study of Usage Fraud on Android Apps," *SPSM '16: Proceedings of the 6th Workshop on Security and Privacy in Smartphones and Mobile Devices*, Vienna, Austria, Oct. 24, 2016, pp. 23-32.

* cited by examiner

*Primary Examiner* — Noura Zoubair
(74) *Attorney, Agent, or Firm* — Seed IP Law Group LLP (57) ABSTRACT

Implementations of the present specification provide a method and an apparatus for identifying an applet of risky content based on differential privacy preserving. An example method includes: responsive to monitoring an operation performed by a user using an applet, determining whether an operation source is a risky operation source, the operation source including a combination of the user and a device used by the user; responsive to determining that the operation source is a risky operation source, disturbing a program identifier of the applet by using a randomized response technique that satisfies local differential privacy preserving; and sending an operation source identifier of the operation source and the disturbed program identifier to a serving end, so that the serving end identifies whether the applet is an applet of risky content based on multiple received disturbed program identifiers by using the randomized response technique.

17 Claims, 5 Drawing Sheets

METHOD AND APPARATUS FOR IDENTIFYING APPLETS OF RISKY CONTENT BASED ON DIFFERENTIAL PRIVACY PRESERVING

BACKGROUND

Technical Field

Implementations of the present specification relate to the field of information security technologies, and specifically, to a method and an apparatus for identifying applets of risky content based on differential privacy preserving.

Description of the Related Art

An applet is an application that can be used without downloading, is developed at a relatively low threshold, and can satisfy a simple basic application.

With the continuous popularity of applets, many practitioners of black-and-grey industries provide sensitive content involved in politics, prohibited content, and/or illegal content such as spam by using applets. Due to the high-traffic exposure of the applets, such risky content is likely to cause relatively dramatic public opinion, which adversely affects related individuals or groups. Therefore, it is very important to identify applets of risky content. With the rise of user's privacy awareness, if accessed applet content is backhauled to a serving end for identification, a privacy compliance problem occurs, likely causing privacy-concerning public opinion, which also adversely affects related individuals or groups.

Therefore, a reasonable and reliable solution is urgently needed, to effectively identify an applet of risky content while preserving user's privacy.

BRIEF SUMMARY

Implementations of the present specification provide a method and an apparatus for identifying an applet of risky content based on differential privacy preserving.

According to a first aspect, an implementation of the present specification provides a method for identifying an applet of risky content based on differential privacy preserving, applied to a client of a service platform and including: in response to monitoring a target operation performed by a user by using an applet served, carried, or otherwise facilitated by the service platform, obtaining a result of determining whether an operation source is a risky operation source, the operation source including a combination of the user and a device used by the user, and the determining result being determined by using a risk identification policy group; in response to determining that the operation source is a risky operation source, disturbing a program identifier of the applet by using a randomized response technique that satisfies local differential privacy preserving, to obtain a disturbed program identifier; and sending an operation source identifier of the operation source and the disturbed program identifier to a serving end of the service platform, so that the serving end identifies whether the applet is an applet of risky content based on multiple received disturbed program identifiers by using the randomized response technique.

In some implementations, the method further includes: before responding to monitoring the target operation performed by the user by using the applet facilitated by the service platform, receiving the risk identification policy group from the serving end.

In some implementations, the obtaining the result of determining whether the operation source is a risky operation source includes: determining whether the operation source has a risk mark, the risk mark being a mark added in advance for a risky operation source based on the risk identification policy group; and if the operation source has a risk mark, determining that the operation source is a risky operation source.

In some implementations, the obtaining the result of determining whether the operation source is a risky operation source includes: determining whether the operation source is a risky operation source by using the risk identification policy group.

In some implementations, the method further includes: after responding to determining that the operation source is a risky operation source, adding a risk mark to the operation source.

In some implementations, the target operation includes at least one of the following items: an information release operation and an information access operation.

In some implementations, the operation source identifier includes an account identifier and a device identifier; the risk identification policy group includes at least one of the following policies: a content risk identification policy, a device risk identification policy, and a list policy, the list policy including an account list and/or a device list; the content risk identification policy is used for risk identification for at least one of the following items: information content related to the target operation in the applet, and historical release data and/or historical access data corresponding to the operation source identifier; the device risk identification policy is used for risk identification for the device corresponding to the device identifier; and the list policy is used for risk identification for the device corresponding to the device identifier and/or an account corresponding to the account identifier.

In some implementations, the determining whether the operation source is a risky operation source by using the risk identification policy group includes: determining a target risk value corresponding to the operation source by using the risk identification policy group; and if the target risk value exceeds a risk threshold, determining that the operation source is a risky operation source; or if the target risk value does not exceed the risk threshold, determining that the operation source is not a risky operation source.

In some implementations, the determining the target risk value corresponding to the operation source by using the risk identification policy group includes: if the risk identification policy group includes a single risk identification policy, determining the target risk value by using the single risk identification policy; or if the risk identification policy group includes multiple risk identification policies, determining multiple risk values for the operation source by using the multiple risk identification policies, and determining the target risk value based on the multiple risk values.

In some implementations, the determining the target risk value based on the multiple risk values includes: determining an average value or a sum of the multiple risk values as the target risk value.

In some implementations, weights are respectively set for the policies in the risk identification policy group; and the determining the target risk value based on the multiple risk values includes: performing weighted summation on the multiple risk values based on the weights of the multiple risk identification policies, and determining a calculated value as the target risk value.

In some implementations, the determining the target risk value corresponding to the operation source by using the risk identification policy group includes: in response to the risk identification policy group including a content risk identification policy, obtaining at least one type of the following target data: information content related to the target operation in the applet, and historical release data and/or historical access data corresponding to the operation source identifier; and determining the target risk value based on the target data by using the content risk identification policy.

In some implementations, the content risk identification policy includes a keyword policy and a content risk identification model, the keyword policy includes at least one keyword and a risk value corresponding to the at least one keyword, and the content risk identification model is used to identify a risk value corresponding to input content; and the determining the target risk value based on the target data by using the content risk identification policy includes: if the target data includes a target keyword that belongs to the at least one keyword, determining the target risk value based on a risk value corresponding to each target keyword; or if the target data does not include the target keyword, identifying a risk value corresponding to the target data by using the content risk identification model, and determining the target risk value based on the risk value.

In some implementations, the operation source identifier includes an account identifier and a device identifier; and the determining the target risk value corresponding to the operation source by using the risk identification policy group includes: in response to the risk identification policy group including a list policy, determining whether at least one information item in the operation source identifier is included in the list policy, the list policy including a device list and/or an account list, risk values being respectively set for the device list and the account list, the device list including at least one device identifier, and the account list including at least one account identifier; and in response to determining that the at least one information item is included in the list policy, determining the target risk value based on a risk value corresponding to the at least one information item.

In some implementations, the disturbing the program identifier of the applet by using the randomized response technique that satisfies local differential privacy preserving includes: converting the program identifier of the applet into a binary string of a target length; and disturbing the binary string based on a disturbing probability by using the randomized response technique.

In some implementations, the randomized response technique includes any one of the following algorithms: k-RR, RAPPOR, and CMS.

According to a second aspect, an implementation of the present specification provides a method for identifying an applet of risky content based on differential privacy preserving, applied to a serving end of a service platform and including: receiving an operation source identifier and a disturbed program identifier that are sent by a client of the service platform, the disturbed program identifier being obtained by disturbing a program identifier of an applet related to the operation source identifier by using a randomized response technique that satisfies local differential privacy preserving in response to an operation source corresponding to the operation source identifier being a risky operation source, the applet belonging to at least one applet facilitated by the service platform; in response to multiple received disturbed program identifiers satisfying a risk identification condition, collecting statistics on access frequency of an applet in the at least one applet based on the multiple disturbed program identifiers by using the randomized response technique, the multiple disturbed program identifiers corresponding to different operation source identifiers; and for an applet in the at least one applet, if access frequency of the applet exceeds a frequency threshold, determining that the applet is an applet of risky content.

In some implementations, the risk identification condition includes that a quantity of disturbed program identifiers reaches a preset quantity.

In some implementations, the collecting statistics on access frequency of an applet in the at least one applet based on the multiple disturbed program identifiers by using the randomized response technique includes: for each of the at least one applet, collecting statistics on a visitor quantity of the applet based on the multiple disturbed program identifiers by using the randomized response technique, and determining access frequency of the applet based on a total quantity of the multiple disturbed program identifiers, the visitor quantity, and a disturbing probability.

In some implementations, the method further includes: after determining that the applet is an applet of risky content, outputting content risk prompt information to a service party to which the applet belongs.

According to a third aspect, an implementation of the present specification provides an apparatus for identifying an applet of risky content based on differential privacy preserving, applied to a client of a service platform and including: an acquisition unit, configured to: in response to monitoring a target operation performed by a user by using an applet facilitated by the service platform, obtain a result of determining whether an operation source is a risky operation source, the operation source including a combination of the user and a device used by the user, and the determining result being determined by using a risk identification policy group; a disturbing unit, configured to: in response to determining that the operation source is a risky operation source, disturb a program identifier of the applet by using a randomized response technique that satisfies local differential privacy preserving, to obtain a disturbed program identifier; and a sending unit, configured to send an operation source identifier of the operation source and the disturbed program identifier to a serving end of the service platform, so that the serving end identifies whether the applet is an applet of risky content based on multiple received disturbed program identifiers by using the randomized response technique.

According to a fourth aspect, an implementation of the present specification provides an apparatus for identifying an applet of risky content based on differential privacy preserving, applied to a serving end of a service platform and including: a receiving unit, configured to receive an operation source identifier and a disturbed program identifier that are sent by a client of the service platform, the disturbed program identifier being obtained by disturbing a program identifier of an applet related to the operation source identifier by using a randomized response technique that satisfies local differential privacy preserving in response to an operation source corresponding to the operation source identifier being a risky operation source, the applet belonging to at least one applet facilitated by the service platform; a statistics collection unit, configured to: in response to multiple received disturbed program identifiers satisfying a risk identification condition, collect statistics on access frequency of an applet in the at least one applet based on the multiple disturbed program identifiers by using the randomized response technique, the multiple disturbed program identifiers corresponding to different operation source identifiers; and an identification unit, configured to: for an applet in the at least one applet, if access frequency of the applet exceeds a frequency threshold, determining that the applet is an applet of risky content.

According to a fifth aspect, an implementation of the present specification provides a computer readable storage medium. The computer readable storage medium stores a computer program, and when the computer program is executed in a computer, the computer is caused to perform the method described in any one of the first aspect, the second aspect, and the implementations of the first aspect and the second aspect.

According to a sixth aspect, an implementation of the present specification provides a computing device, including a memory and a processor. The memory stores executable code, and when executing the executable code, the processor implements the method described in any one of the first aspect, the second aspect, and the implementations of the first aspect and the second aspect.

According to the method and the apparatus for identifying an applet of risky content based on differential privacy preserving provided in the above implementations of the present specification, in response to monitoring the target operation performed by the user by using the applet facilitated by the service platform, the client of the service platform obtains the result of determining whether the operation source is a risky operation source, the operation source including the combination of the user and the device used by the user, and the determining result being determined by using the risk identification policy group; in response to determining that the operation source is a risky operation source, disturbs the program identifier of the applet by using the randomized response technique that satisfies local differential privacy preserving, to obtain the disturbed program identifier; and sends the operation source identifier of the operation source and the disturbed program identifier to the serving end of the service platform, so that the serving end counts access frequency of an applet in the at least one applet facilitated by the service platform based on the multiple disturbed program identifiers by using the randomized response technique in response to the multiple received disturbed program identifiers satisfying the risk identification condition; and for an applet in the at least one applet, if access frequency of the applet exceeds the frequency threshold, determines that the applet is an applet of risky content. As such, the client performs local differential privacy preserving processing on the program identifier of the applet accessed by the user, so that the serving end can obtain valid access frequency statistics information, but cannot determine authenticity of each record, thereby effectively identifying an applet of risky content while preserving user's privacy.

BRIEF DESCRIPTION OF THE SEVERAL VIEWS OF THE DRAWINGS

To describe the technical solutions in the multiple implementations disclosed in the present specification more clearly, the following briefly describes the accompanying drawings required for describing the implementations. Clearly, the accompanying drawings in the following description show merely multiple implementations disclosed in the present specification, and a person of ordinary skill in the art can still derive other drawings from these accompanying drawings without creative efforts.

DETAILED DESCRIPTION

The following further describes the specification in detail with reference to the accompanying drawings and implementations. It can be understood that the specific implementations described herein are merely used to explain, instead of limiting, the disclosed technology. The described implementations are merely some but not all of the implementations of the present specification. All other implementations obtained by a person of ordinary skill in the art based on the implementations of the present specification without creative efforts shall fall within the protection scope of the present application.

It should be noted that, for ease of description, only parts related to the disclosed technology are shown in the accompanying drawings. The implementations of the present specification and features in the implementations can be mutually combined without a conflict.

Some implementations of the present specification provide a method for identifying an applet of risky content based on differential privacy preserving. According to the method, an applet of risky content can be effectively identified while user's privacy can be preserved. Specifically, FIG. 1 illustrates an example system architectural diagram to which these implementations are applicable.

Figure 1:
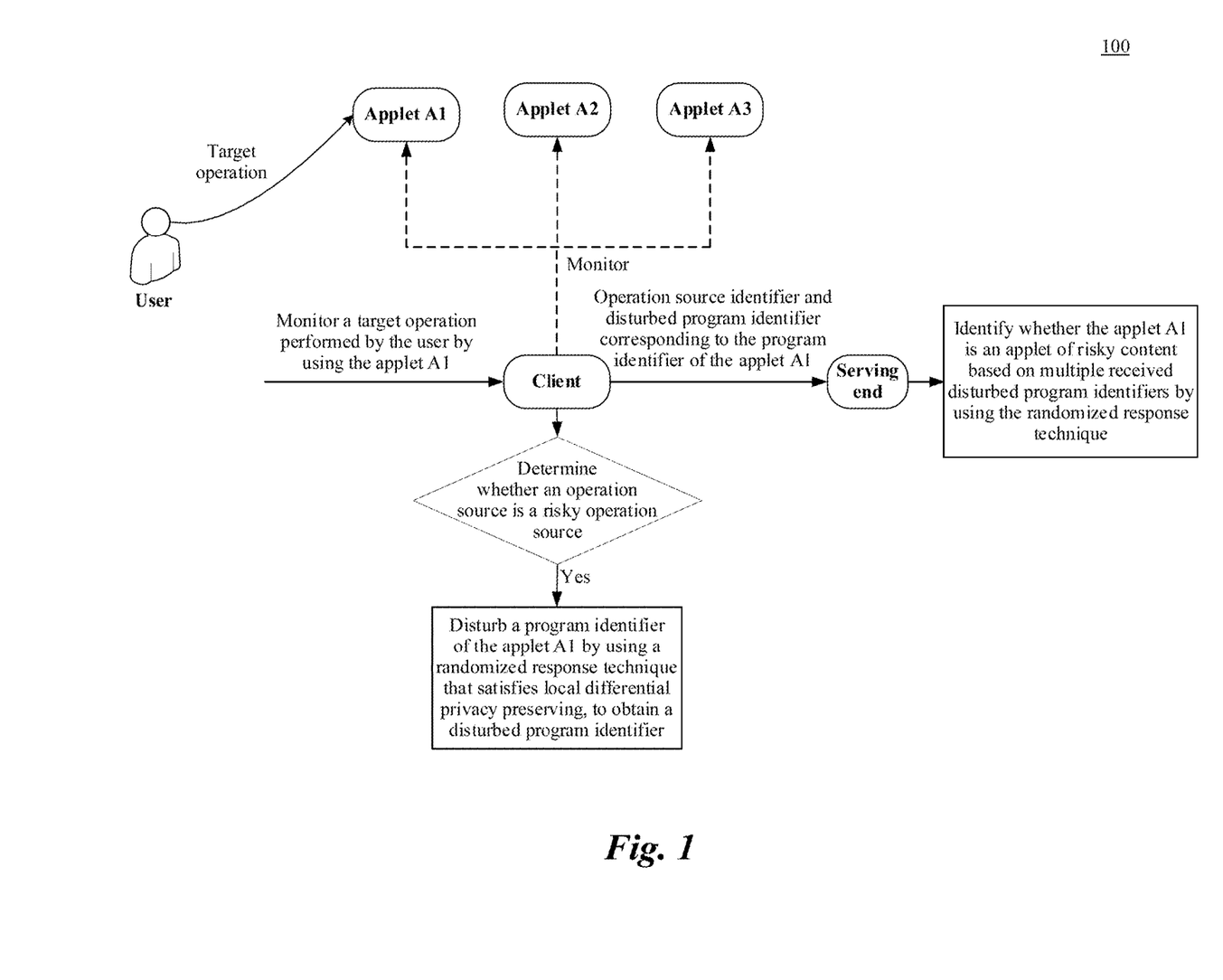
FIG. 1 illustrates an example system architectural diagram to which some implementations of the present specification are applicable.

As shown in FIG. 1, a service platform 100 includes a client, a serving end, and applets A1, A2, and A3 served, carried, or otherwise facilitated by the service platform 100. The client has a monitoring function related to the applets, a risky operation source determining function, a local differential privacy preserving function, etc. The serving end has an applet of risky content identification function. The serving end can be implemented as a single server or a server cluster, and the server can be a cloud server or a physical server. No specific limitation is imposed herein.

In practice, the client can monitor target operations performed by a user by using the applets A1, A2, and A3. The target operation can include but is not limited to, for example, an information release operation and/or an information access operation.

The applet A1 is used as an example. In response to monitoring a target operation performed by the user by using the applet A1, the client can determine whether an operation source is a risky operation source. The operation source includes a combination of the user and a device used by the user. Then, in response to determining that the operation source is a risky operation source, the client can disturb a program identifier of the applet A1 by using a randomized response technique that satisfies local differential privacy preserving, to obtain a disturbed program identifier; and send an operation source identifier of the operation source and the disturbed program identifier to the serving end of the service platform 100, so that the serving end identifies whether the applet A1 is an applet of risky content based on multiple received disturbed program identifiers by using the randomized response technique.

It should be understood that quantities of clients, serving ends, and applets in FIG. 1 are merely examples. Depending on implementation needs, there can be any quantities of clients, serving ends, and applets.

The following describes specific implementation steps of the method with reference to specific implementations.

Figure 2:
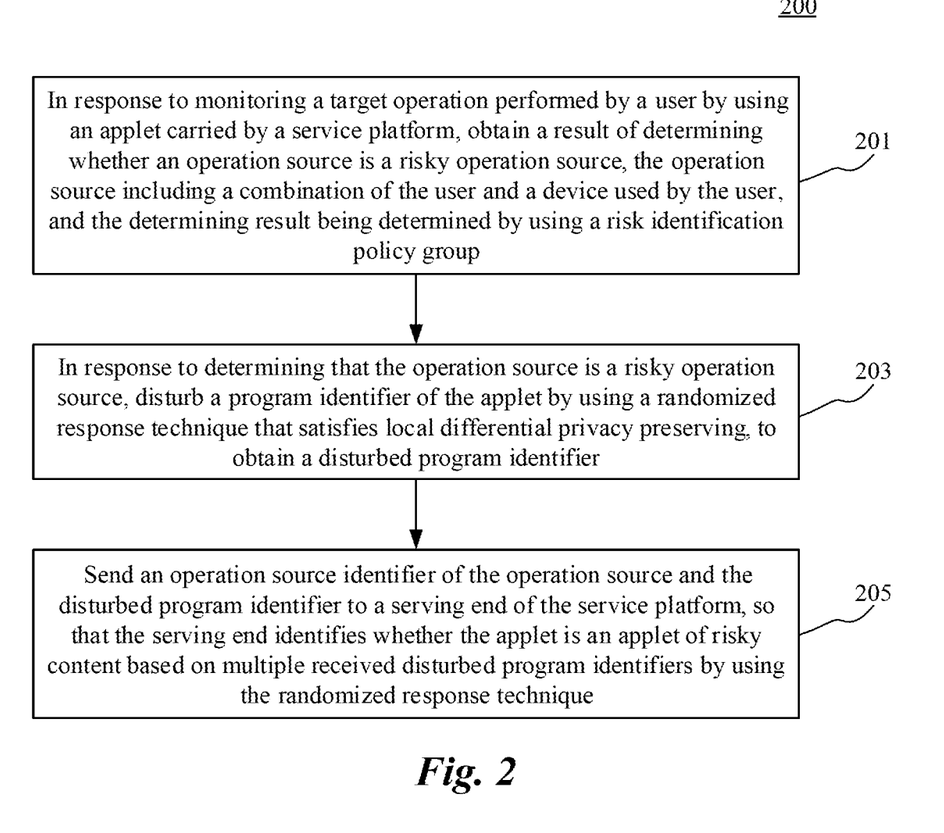
FIG. 2 is a flowchart illustrating an implementation of a method for identifying an applet of risky content based on differential privacy preserving according to the present specification.

FIG. 2 illustrates a process 200 of an implementation of a method for identifying an applet of risky content based on differential privacy preserving. An execution body of the method can be the client shown in FIG. 1. The method includes the following steps:

Step 201: In response to monitoring a target operation performed by a user by using an applet served, carried, or otherwise facilitated by a service platform, obtain a result of determining whether an operation source is a risky operation source, the operation source including a combination of the user and a device used by the user, and the determining result being determined by using a risk identification policy group.

Step 203: In response to determining that the operation source is a risky operation source, disturb a program identifier of the applet by using a randomized response technique that satisfies local differential privacy preserving, to obtain a disturbed program identifier.

Step 205: Send an operation source identifier of the operation source and the disturbed program identifier to a serving end of the service platform, so that the serving end identifies whether the applet is an applet of risky content based on multiple received disturbed program identifiers by using the randomized response technique.

In this implementation, the service platform facilitates at least one applet, and the user can use any one of the at least one applet to release information and/or access information, etc. The execution body can perform content behavior monitoring on the at least one applet. Specifically, the execution body can monitor a target operation performed by the user by using any one of the at least one applet. The target operation can include but is not limited to, for example, an information release operation and/or an information access operation.

The following further describes steps 201 to 205.

In step 201, in response to monitoring the target operation performed by the user by using the applet facilitated by the service platform, the execution body can obtain the result of determining whether the operation source is a risky operation source. The operation source can include the combination of the user and the device used by the user, and the determining result is determined by using the risk identification policy group.

The operation source identifier of the operation source can include an account identifier and a device identifier. An account corresponding to the account identifier can be an account used when the user logs in to the applet, or an account used when the user logs in to a client application to which the applet belongs. No specific limitation is imposed herein. The device identifier corresponds to the used device.

In practice, different devices may have been logged in to by using one user account. For example, a user to which the account belongs or a relative of the user to which the account belongs uses the account for login, or an illegal user stealing the account uses the account for login. The combination of the user and the device used by the user are determined as the operation source, so that user differentiation can be effectively performed.

Generally, the risk identification policy group can include at least one of the following policies: a content risk identification policy, a device risk identification policy, and a list policy. The list policy can include an account list and/or a device list. The content risk identification policy can be used for risk identification for at least one of the following items: information content related to the target operation in the applet, and historical release data and/or historical access data corresponding to the operation source identifier. The device risk identification policy can be used for risk identification for the device corresponding to the device identifier in the operation source identifier. The list policy can be used for risk identification for at least one of the following items: the device corresponding to the device identifier in the operation source identifier and the account corresponding to the account identifier in the operation source identifier.

The historical release data and the historical access data can be data in a predetermined time period, and the predetermined time period can be, for example, nearly one day, two days, three days, or one week. No specific limitation is imposed herein.

In step 201, the execution body can obtain the result of determining whether the operation source is a risky operation source by using various methods.

For example, the execution body can determine whether the operation source has a risk mark, the risk mark being a mark added in advance for a risky operation source based on the risk identification policy group; and if the operation source has a risk mark, determine that the operation source is a risky operation source.

For another example, the execution body can determine whether the operation source is a risky operation source by using the risk identification policy group. Further, in response to determining that the operation source has no risk mark, the execution body can determine whether the operation source is a risky operation source by using the risk identification policy group; or in response to monitoring the target operation performed by the user by using the applet facilitated by the service platform, the execution body can directly determine whether the operation source is a risky operation source by using the risk identification policy group.

As an example, when determining whether the operation source is a risky operation source by using the risk identification policy group, the execution body can determine whether the operation source is a risky operation source by using at least one risk identification policy in the risk identification policy group. Specifically, when the risk identification policy group includes a single risk identification policy, the execution body can determine whether the operation source is a risky operation source by using the single risk identification policy; or when the risk identification policy group includes multiple risk identification policies and priorities can be set for the risk identification policies in the risk identification policy group, the execution body can determine whether the operation source is a risky operation source by sequentially using all the risk identification policies in descending order of the priorities, until determining that the operation source is a risky operation source, or determining that the operation source is not a risky operation source by using all the risk identification policies.

For example, the multiple risk identification policies are the listed policy, the device risk identification policy, and the content risk identification policy in descending order of the priorities. The list policy can include the account list and/or the device list, the account list can include at least one account identifier, and the device list can include at least one device identifier. The device risk identification policy can include at least one device category. The at least one device category can include but is not limited to, for example, a virtual machine and/or a root machine. No specific limitation is imposed herein. The content risk identification policy can include at least one keyword and/or a content risk identification model. The at least one keyword is used for risk identification. The content risk identification model can be used to identify whether input content is at risk.

When determining whether the operation source is a risky operation source by sequentially using all of the multiple risk identification policies, the execution body can first determine whether at least one information item in the operation source identifier of the operation source is included in the list policy; and if yes, can determine that the operation source is a risky operation source. If determining that neither of the information items in the operation source identifier is included in the list policy, the execution body can further determine whether the device corresponding to the device identifier in the operation source identifier belongs to the device category in the device risk identification policy; and if yes, can determine that the operation source is a risky operation source. If determining that the device corresponding to the device identifier does not belong to the device category in the device risk identification policy, the execution body can determine whether the operation source is a risky operation source by using the content risk identification policy.

Specifically, when determining whether the operation source is a risky operation source by using the content risk identification policy, the execution body can obtain at least one type of the following target data: the information content related to the target operation in the applet, the historical release data and/or historical access data corresponding to the operation source identifier, etc. Assuming that the content risk identification policy includes the at least one keyword and the content risk identification model, the execution body can first determine whether the target data includes a target keyword that belongs to the at least one keyword; and if yes, can determine that the operation source is a risky operation source. If determining that the target data does not include the target keyword, the execution body can further identify whether the target data is at risk by using the content risk identification model. If identifying that the target data is at risk, the execution body can determine that the operation source is a risky operation source. If identifying that the target data is not at risk, the execution body can determine that the operation source is not a risky operation source.

The above example describes a method for determining whether the operation source is a risky operation source when the multiple risk identification policies are the listed policy, the device risk identification policy, and the content risk identification policy in descending order of the priorities and the content risk identification policy includes the at least one keyword and the content risk identification model. Methods for determining whether the operation source is a risky operation source in cases of the multiple risk identification policies and other combinations of the content risk identification policy can be obtained by analogy based on the above example, and are not enumerated herein by using examples.

It should be noted that the risk identification policy group can be received from the serving end. In some embodiments, before step 201, the execution body can receive the risk identification policy group from the serving end.

In addition, in a monitoring process, the serving end can update the risk identification policy group. Therefore, the execution body can receive an updated risk identification policy group in real time.

In some embodiments, if determining that the operation source is a risky operation source in step 201, the execution body can add a risk mark to the operation source. Further, if determining that the operation source is a risky operation source and the operation source has no risk mark in step 201, the execution body can add the risk mark to the operation source.

In step 203, in response to determining that the operation source is a risky operation source, the execution body can disturb the program identifier of the applet mentioned in step 201 by using the randomized response technique (Randomized Response Technique, RRT) that satisfies local differential privacy preserving, to obtain the disturbed program identifier.

In practice, the randomized response technique is one of common methods in sensitive problem investigation. The randomized response technique is generally an investigation method in which a specific randomizing apparatus is used in a survey process to cause a respondent to select one question from two or more questions at a predetermined basic probability P to answer, and no one (including an investigator) except the respondent knows which question is answered by the respondent, thereby preserving privacy of the respondent; and finally true distribution of a sensitive problem feature in the population is calculated based on the knowledge of probability theory.

In addition, the randomized response technique satisfies $\varepsilon$-local differential privacy preserving, and the parameter $\varepsilon$ can be referred to as a privacy preserving budget. The parameter $\varepsilon$ is used to reflect a privacy preserving level. Specifically, a smaller value of the parameter $\varepsilon$ can indicate a higher privacy preserving level.

In the present specification, the basic probability P can be referred to as a disturbing probability. Values of the parameter $\varepsilon$ and the disturbing probability can be set based on an actual need. No specific limitation is imposed herein.

In some embodiments, the randomized response technique in the present specification can include any one of the following algorithms: k-RR, RAPPOR (Randomized Aggregatable Privacy-Preserving Ordinal Response), CMS (Private Count Mean Sketch), etc.

In the k-RR algorithm, k represents a quantity of candidate values, and RR is an English abbreviation of random response. Corresponding to the solutions described in the present specification, k can represent a quantity of the at least one applet facilitated by the service platform.

The RAPPOR algorithm is a representative method of single-value frequency statistics collection, a value of a variable being represented in a form of a string. Corresponding to the solutions described in the present specification, the variable can represent a program identifier attribute, and the value of the variable can be a program identifier of the at least one applet.

The CMS algorithm generally means integrating records submitted by a device and outputting a count histogram in a domain element dictionary, while preserving local differential privacy. This process usually includes two stages: client processing and then server end integration.

It should be noted that, because the randomized response technique and the above algorithms included in the randomized response technique are well-known technologies widely studied and applied at present, details are omitted herein for simplicity.

In step 203, if the program identifier of the applet is a binary string, the execution body can directly disturb the program identifier of the applet based on the disturbing probability by using the randomized response technique. If the program identifier of the applet is not a binary string, the execution body can convert the program identifier of the applet into a binary string of a target length, and then disturb the binary string based on the disturbing probability by using the randomized response technique.

The target length can be equal to the quantity of the at least one applet. In addition, the at least one applet can respectively have a corresponding index number, and the index number is a natural number greater than or equal to 1 and less than or equal to the quantity. When converting the program identifier of the applet into the binary string of the target length, for example, the execution body can first initialize a target-length string whose characters are all 0, and then can set a character on a bit corresponding to an index number of the applet in the string to 1.

It should be understood that the program identifier of the applet can be converted into the binary string of the target length through one-hot encoding.

When disturbing the binary string, the execution body can disturb a character on at least one bit in the binary string based on the disturbing probability. For example, for each of the at least one bit, the execution body can disturb a character on the bit by setting the character on the bit from 0 to 1 or from 1 to 0.

In step 205, the execution body can send the operation source identifier of the operation source and the disturbed program identifier to the serving end of the service platform, so that the serving end identifies whether the applet is an applet of risky content based on the multiple received disturbed program identifiers by using the randomized response technique. Herein, for operations performed by the serving end, references can be made to related descriptions in the implementation corresponding to FIG. 4.

It should be noted that, when the operation source is a risky operation source, it is very likely that information content related to the target operation corresponding to the operation source is illegal content. Uploading the disturbed program identifier of the applet targeted by the target operation to the serving end can help the serving end accurately identify an applet of risky content.

In addition, in the solutions described in this implementation, only a disturbed program identifier of an applet related to a risky operation source is uploaded to the serving end, without uploading a large amount of content data to the serving end, thereby avoiding wastes of user bandwidth and computing resources of the serving end.

According to the method for identifying an applet of risky content based on differential privacy preserving, in response to monitoring the target operation performed by the user by using the applet carried by the service platform, the client of the service platform obtains the result of determining whether the operation source is a risky operation source, the operation source including the combination of the user and the device used by the user, and the determining result being determined by using the risk identification policy group; in response to determining that the operation source is a risky operation source, disturbs the program identifier of the applet by using the randomized response technique that satisfies local differential privacy preserving, to obtain the disturbed program identifier; and sends the operation source identifier of the operation source and the disturbed program identifier to the serving end of the service platform, so that the serving end identifies whether the applet is an applet of risky content based on the multiple received disturbed program identifiers by using the randomized response technique. As such, the client performs local differential privacy preserving processing on the program identifier of the applet accessed by the user, so that the serving end can obtain valid access frequency statistics information, but cannot determine authenticity of each record, thereby effectively identifying an applet of risky content while preserving user's privacy.

Figure 3:
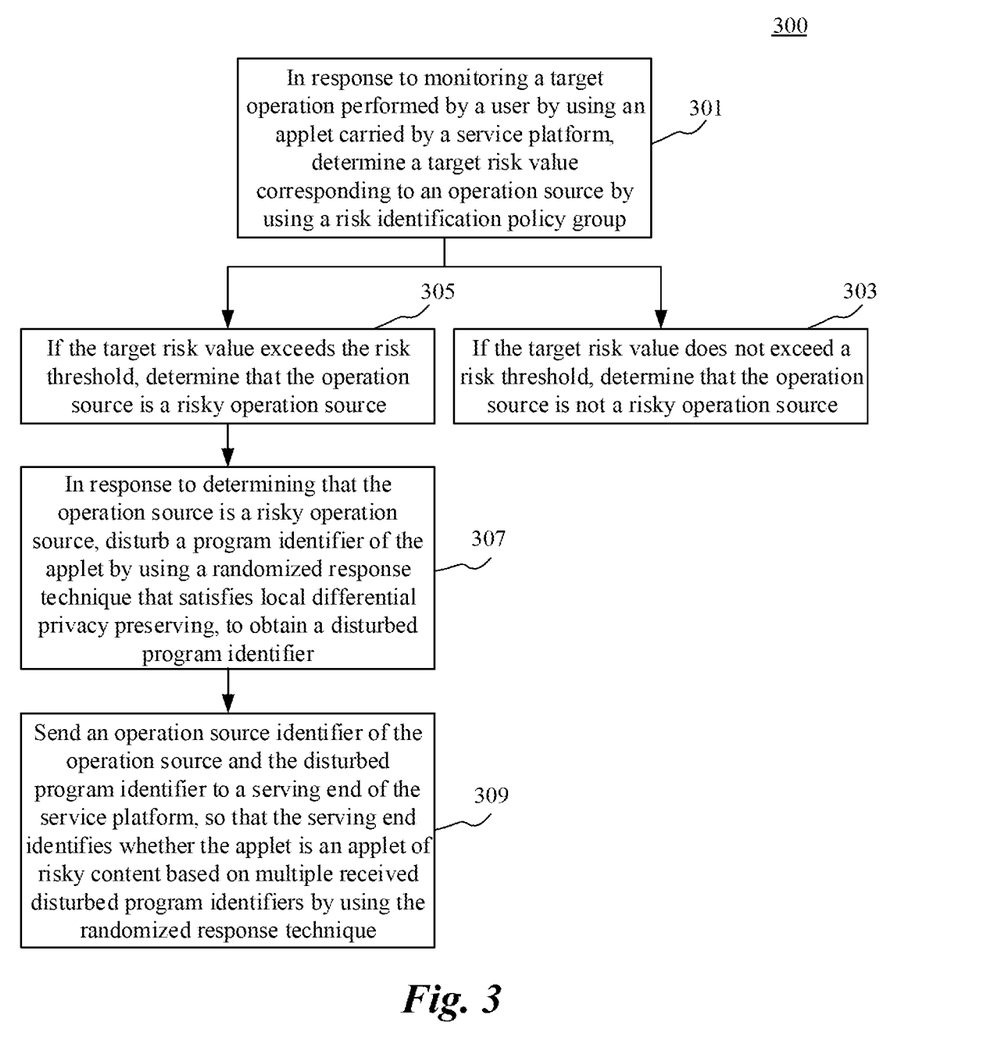
FIG. 3 is a flowchart illustrating another implementation of a method for identifying an applet of risky content based on differential privacy preserving according to the present specification.

Next, FIG. 3 illustrates a process 300 of another implementation of a method for identifying an applet of risky content based on differential privacy preserving. An execution body of the method can be the client shown in FIG. 1. The method includes the following steps:

Step 301: In response to monitoring a target operation performed by a user by using an applet facilitated by a service platform, determine a target risk value corresponding to an operation source by using a risk identification policy group.

Step 303: If the target risk value does not exceed a risk threshold, determine that the operation source is not a risky operation source.

Step 305: If the target risk value exceeds the risk threshold, determine that the operation source is a risky operation source.

Step 307: In response to determining that the operation source is a risky operation source, disturb a program identifier of the applet by using a randomized response technique that satisfies local differential privacy preserving, to obtain a disturbed program identifier.

Step 309: Send an operation source identifier of the operation source and the disturbed program identifier to a serving end of the service platform, so that the serving end identifies whether the applet is an applet of risky content based on multiple received disturbed program identifiers by using the randomized response technique.

In this implementation, the service platform facilitates at least one applet, and the user can use any one of the at least one applet to release information and/or access information, etc. The execution body can perform content behavior monitoring on the at least one applet. Specifically, the execution body can monitor a target operation performed by the user by using any one of the at least one applet. The target operation can include but is not limited to, for example, an information release operation and/or an information access operation.

It should be noted that, for step 307 and step 309, references can be made to the related descriptions of step 203 and step 205 in the implementation corresponding to FIG. 2. Details are omitted herein for simplicity.

The following further describes steps 301 to 305.

In step 301, in response to monitoring the target operation performed by the user by using the applet facilitated by the service platform, the execution body can determine the target risk value corresponding to the operation source by using the risk identification policy group. The operation source can include a combination of the user and a device used by the user. Correspondingly, the operation source identifier of the operation source can include an account identifier and a device identifier. An account corresponding to the account identifier can be an account used when the user logs in to the applet, or an account used when the user logs in to a client application to which the applet belongs. No specific limitation is imposed herein. The device identifier corresponds to the used device.

The risk identification policy group can include any one of the following policies: a content risk identification policy, a device risk identification policy, a list policy, etc.

The content risk identification policy can be used for risk identification for at least one of the following items: information content related to the target operation in the applet, and historical release data and/or historical access data corresponding to the operation source identifier. Specifically, the content risk identification policy can include a keyword policy and/or a content risk identification model. The keyword policy can include at least one keyword and a risk value respectively corresponding to the at least one keyword. The content risk identification model can be used to identify a risk value corresponding to input content.

The device risk identification policy can be used for risk identification for the device corresponding to the device identifier in the operation source identifier. Specifically, the device risk identification policy can include at least one device category and a risk value respectively corresponding to the at least one device category.

The list policy can include an account list and/or a device list. The list policy can be used for risk identification for at least one of the following items: the device corresponding to the device identifier in the operation source identifier and the account corresponding to the account identifier in the operation source identifier. Specifically, risk values can be respectively set for the device list and the account list. The device list can include at least one device identifier. The account list can include at least one account identifier.

In practice, if the risk identification policy group includes a single risk identification policy, the execution body can determine the target risk value by using the single risk identification policy. If the risk identification policy group includes multiple risk identification policies, the execution body can determine multiple risk values for the operation source by using the multiple risk identification policies, and determine the target risk value based on the multiple risk values. Specifically, the execution body can determine an average value or a sum of the multiple risk values as the target risk value. Alternatively, if weights are respectively set for the policies in the risk identification policy group, the execution body can perform weighted summation on the multiple risk values based on the weights of the multiple risk identification policies, and determine a calculated value as the target risk value.

In some embodiments, if the risk identification policy group includes the content risk identification policy, the execution body can determine the target risk value by performing the following steps S1 and S2:

S1. Obtain at least one type of the following target data: the information content related to the target operation in the applet, and the historical release data and/or historical access data corresponding to the operation source identifier.

S2. Determine the target risk value based on the target data by using the content risk identification policy.

The historical release data and the historical access data can be data in a predetermined time period, and the predetermined time period can be, for example, nearly one day, two days, three days, or one week. No specific limitation is imposed herein.

If the content risk identification policy includes the keyword policy, step S2 can include:

S21. If the target data includes a target keyword that belongs to the at least one keyword, determine the target risk value based on a risk value corresponding to each target keyword.

If the content risk identification policy includes the content risk identification model, step S2 can include:

S22. Identify a risk value corresponding to the target data by using the content risk identification model, and determine the target risk value based on the risk value.

The target data can be input into the content risk identification model, so that the content risk identification model outputs the risk value corresponding to the target data.

In addition, if the content risk identification policy includes the keyword policy and the content risk identification model, in addition to step S21, step S2 further includes: if the target data does not include the target keyword, performing step S22.

It should be noted that, when the risk identification policy group includes a single risk identification policy, in step S21, the execution body can determine the target risk value based on only the risk value corresponding to each target keyword. For example, if the at least one keyword includes one target keyword, the execution body can directly determine a risk value corresponding to the target keyword as the target risk value; or if the at least one keyword includes multiple target keywords, the execution body can determine an average value or a sum of risk values respectively corresponding to the multiple target keywords as the target risk value.

In addition, when the risk identification policy group includes multiple risk identification policies, the determining the target risk value based on the risk value corresponding to each target keyword in step S21 can include:

S211. Determine a risk value of the operation source corresponding to the content risk identification policy based on the risk value corresponding to each target keyword.

S212. Determine a risk value of the operation source corresponding to another risk identification policy in the risk identification policy group by using the another risk identification policy.

S213. Determine the target risk value based on multiple risk values of the operation source corresponding to all the risk identification policies.

A method for determining the risk value of the operation source corresponding to the content risk identification policy based on the risk value corresponding to each target keyword is similar to the method for determining the target risk value based on only the risk value corresponding to each target keyword when the risk identification policy group includes a single risk identification policy. Details are omitted herein for simplicity.

Technical implementation details of step S22 can be obtained by analogy based on the above content related to step S22, and are omitted herein.

In some embodiments, if the risk identification policy group includes the device risk identification policy, the execution body can determine the target risk value by performing the following step S3:

S3. For the device identifier in the operation source identifier of the operation source, determine whether the device corresponding to the device identifier belongs to the device category in the device risk identification policy; and if yes, determine the target risk value based on a risk value corresponding to the device category to which the device corresponding to the device identifier belongs.

When the risk identification policy group includes a single risk identification policy, in step S3, for the device identifier in the operation source identifier of the operation source, if the device corresponding to the device identifier belongs to the device category in the device risk identification policy, the execution body can directly determine the risk value corresponding to the device category to which the device corresponding to the device identifier belongs as the target risk value. In addition, if the device corresponding to the device identifier does not belong to the device category in the device risk identification policy, the execution body can directly determine 0 as the target risk value.

When the risk identification policy group includes multiple risk identification policies, in step S3, the determining the target risk value based on the risk value corresponding to the device category to which the device corresponding to the device identifier belongs can include step S31 and the above steps S212 and S213. Step S31 includes: determining the risk value corresponding to the device category to which the device corresponding to the device identifier belongs as a risk value of the operation source corresponding to the device risk identification policy.

In some embodiments, when the risk identification policy group includes multiple risk identification policies, in step S3, for the device identifier in the operation source identifier of the operation source, if determining that the device corresponding to the device identifier does not belong to the device category in the device risk identification policy, the execution body can determine 0 as a risk value of the operation source corresponding to the device risk identification policy, and perform the above steps S212 and S213.

In some embodiments, if the risk identification policy group includes the list policy, the execution body can determine the target risk value by performing the following step S4:

S4. Determine whether at least one information item in the operation source identifier of the operation source is included in the list policy; and if yes, determine the target risk value based on a risk value corresponding to the at least one information item.

The at least one information item includes the account identifier and/or the device identifier.

When the risk identification policy group includes a single risk identification policy, in step S4, if determining that the at least one information item in the operation source identifier is included in the list policy, the execution body can directly determine the target risk value based on the risk value corresponding to the at least one information item. For example, if the at least one information item includes a single information item, the execution body can determine a risk value corresponding to the single information item as the target risk value; or if the at least one information item includes multiple information items, the execution body can determine an average value or a sum of risk values respectively corresponding to the multiple information items as the target risk value. In addition, if determining that neither of the information items in the operation source identifier is included in the list policy, the execution body can determine 0 as the target risk value.

When the risk identification policy group includes multiple risk identification policies, in step S4, the determining the target risk value based on the risk value corresponding to the at least one information item can include step S41 and the above steps S212 and S213. Step S41 includes: determining a risk value of the operation source corresponding to the list policy based on the risk value corresponding to the at least one information item.

In some embodiments, when the risk identification policy group includes multiple risk identification policies, in step S4, if determining that neither of the information items in the operation source identifier of the operation source is included in the list policy, the execution body can determine 0 as a risk value of the operation source corresponding to the list policy, and perform the above steps S212 and S213.

In step 303, if the target risk value does not exceed the risk threshold, the execution body can determine that the operation source is not a risky operation source, and can terminate the current execution of the process 300.

In step 305, if the target risk value exceeds the risk threshold, the execution body can determine that the operation source is a risky operation source, and can continue to perform step 307.

In some embodiments, before step 301, the execution body can receive the risk identification policy group from the serving end.

In some embodiments, after step 305, the execution body can add a risk mark to the operation source. Further, in response to the operation source having no risk mark, the execution body can add the risk mark to the operation source.

Compared with the implementation corresponding to FIG. 2, the method for identifying an applet of risky content based on differential privacy preserving provided in this implementation highlights the steps of determining the target risk value corresponding to the operation source by using the risk identification policy group and determining whether the operation source is a risky operation source based on the target risk value. Therefore, in the solutions described in this implementation, flexibility of the risky operation source identification method can be implemented, and accuracy of a risky operation source identification result can be improved. Further, the serving end can have relatively high identification accuracy for an applet of risky content.

The above describes the solutions executed on a client side. The following describes a method for identifying an applet of risky content based on differential privacy preserving executed on a serving end side.

Figure 4:
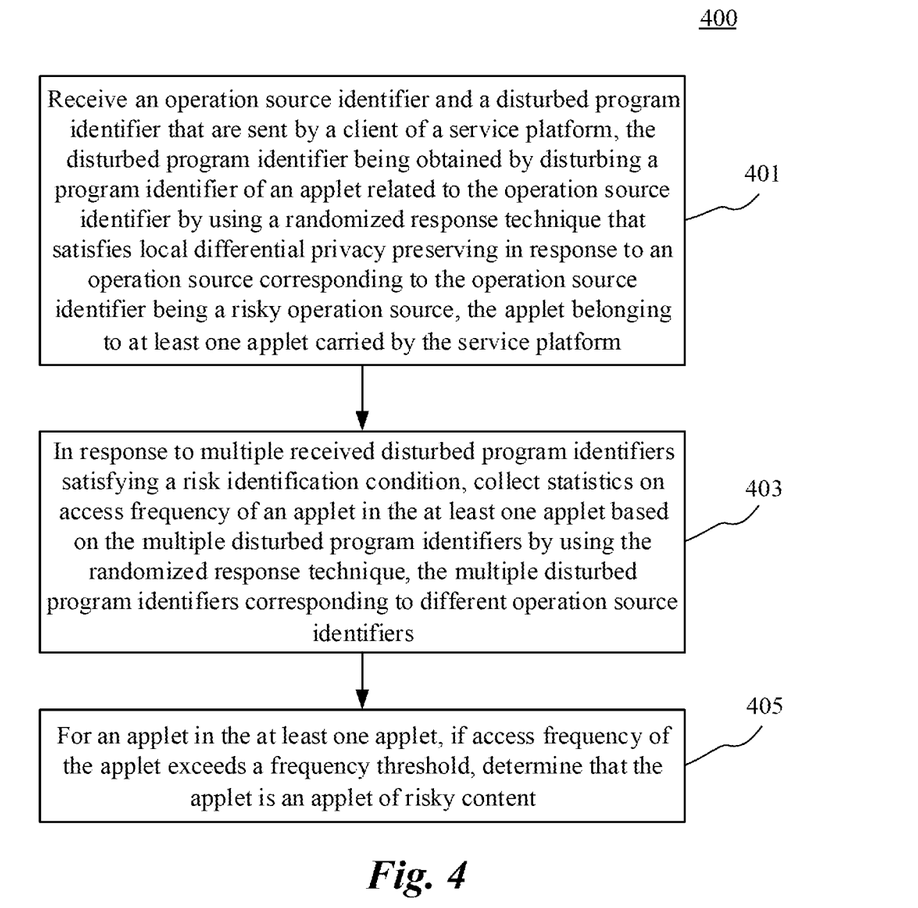
FIG. 4 is a flowchart illustrating still another implementation of a method for identifying an applet of risky content based on differential privacy preserving according to the present specification.

FIG. 4 illustrates a process 400 of still another implementation of a method for identifying an applet of risky content based on differential privacy preserving. An execution body of the method can be the serving end shown in FIG. 1. The method includes the following steps:

Step 401: Receive an operation source identifier and a disturbed program identifier that are sent by a client of a service platform, the disturbed program identifier being obtained by disturbing a program identifier of an applet related to the operation source identifier by using a randomized response technique that satisfies local differential privacy preserving in response to an operation source corresponding to the operation source identifier being a risky operation source, the applet belonging to at least one applet facilitated by the service platform.

Step 403: In response to multiple received disturbed program identifiers satisfying a risk identification condition, collect statistics on access frequency of an applet in the at least one applet based on the multiple disturbed program identifiers by using the randomized response technique, the multiple disturbed program identifiers corresponding to different operation source identifiers.

Step 405: For an applet in the at least one applet, if access frequency of the applet exceeds a frequency threshold, determine that the applet is an applet of risky content.

The following further describes steps 401 to 405.

In step 401, the operation source identifier and the disturbed program identifier can be sent by the client by using the method described in the implementation corresponding to FIG. 2 or FIG. 3. For explanations and descriptions of the operation source identifier and the disturbed program identifier, references can be made to the above related descriptions. Details are omitted herein for simplicity.

In practice, the disturbed program identifier is a binary string, and a length of the disturbed program identifier is usually equal to a quantity of the at least one applet. In addition, each bit in the disturbed program identifier corresponds to an applet in the at least one applet.

As an example, the at least one applet can respectively have a corresponding index number, and the index number is a natural number greater than or equal to 1 and less than or equal to the quantity. For any one of the at least one applet, if an index number of the applet is i, the applet can correspond to the ith bit in the disturbed program identifier. i is a natural number greater than or equal to 1 and less than or equal to the quantity.

In step 403, in response to the multiple received disturbed program identifiers satisfying the risk identification condition, the execution body can collect statistics on access frequency of an applet in the at least one applet based on the multiple disturbed program identifiers by using the randomized response technique. The multiple disturbed program identifiers correspond to different operation source identifiers.

The risk identification condition can include, for example, a quantity of disturbed program identifiers reaches a preset quantity. Generally, a larger quantity of disturbed program identifiers indicates a more accurate result of identifying an applet of risky content. It should be understood that the risk identification condition can be set based on an actual need. No specific limitation is imposed herein.

The randomized response technique can include any one of the following algorithms: k-RR, RAPPOR, CMS, etc. It should be understood that the execution body and the client use the same algorithm.

In practice, for each of the at least one applet, the execution body can collect statistics on a visitor quantity of the applet based on the multiple disturbed program identifiers by using the randomized response technique, and determine access frequency of the applet based on a total quantity of the multiple disturbed program identifiers, the visitor quantity, and a disturbing probability.

It should be noted that one operation source can represent one user. Because the multiple disturbed program identifiers correspond to different operation source identifiers, the total quantity of the multiple disturbed program identifiers can be considered as a total quantity of users associated with the multiple disturbed program identifiers. In addition, the disturbing probability is the same as a disturbing probability used when the client disturbs the program identifier of the applet.

As an example, for each of the at least one applet, the applet is referred to as a target applet. When collecting statistics on a visitor quantity of the target applet, for bits corresponding to the target applet in the multiple disturbed program identifiers, the execution body can collect statistics on a quantity of occurrence times of 1 on the bits, and determine the quantity of occurrence times as the visitor quantity of the target applet.

Because the disturbed program identifier is noise-added data and the visitor quantity obtained through statistics collection is not a real quantity, the visitor quantity needs to be corrected.

Generally, the total quantity of the multiple disturbed program identifiers can be set to n, the visitor quantity obtained through statistics collection for the target applet can be set to n1, a quantity of persons that do not access the target applet can be set to n−n1, a real access ratio of the target applet can be set to $\pi$, and the disturbing probability can be set to P. A likelihood function can be constructed based on the parameters n, n1, n−n1, $\pi$, and P, and a maximum likelihood estimate $\hat{\pi}$ of $\pi$ can be obtained based on the likelihood function. Subsequently, a product of $\hat{\pi}$ and n can be determined as a corrected visitor number N, and the corrected visitors number N may be determined as access frequency of the target applet.

It should be noted that, because the randomized response technique and the above algorithms included in the randomized response technique are well-known technologies widely studied and applied at present, an access frequency statistics collection method is not described in detail herein.

In step 405, for each of the at least one applet, if the access frequency of the applet exceeds the frequency threshold, the execution body can determine that the applet is an applet of risky content.

In some embodiments, after determining that the applet is an applet of risky content, the execution body can output content risk prompt information to a service party to which the applet belongs, so that the service party processes, for example, rectifies the applet. This helps reduce the probability that a content risk exists in the applet facilitated by the service platform.

According to the method for identifying an applet of risky content based on differential privacy preserving provided in this implementation, the serving end of the service platform receives the operation source identifier and the disturbed program identifier that are sent by the client of the service platform; and then, in response to the multiple received disturbed program identifiers satisfying the risk identification condition, collects statistics on access frequency of an applet in the at least one applet facilitated by the service platform based on the multiple disturbed program identifiers by using the randomized response technique, the multiple disturbed program identifiers corresponding to different operation source identifiers, so that the serving end of the service platform identifies the applet as an applet of risky content when the access frequency of the applet exceeds the frequency threshold. As such, the client performs local differential privacy preserving processing on the program identifier of the applet accessed by the user, so that the serving end can obtain valid access frequency statistics information, but cannot determine authenticity of each record, thereby effectively identifying an applet of risky content while preserving user's privacy.

Figure 5:
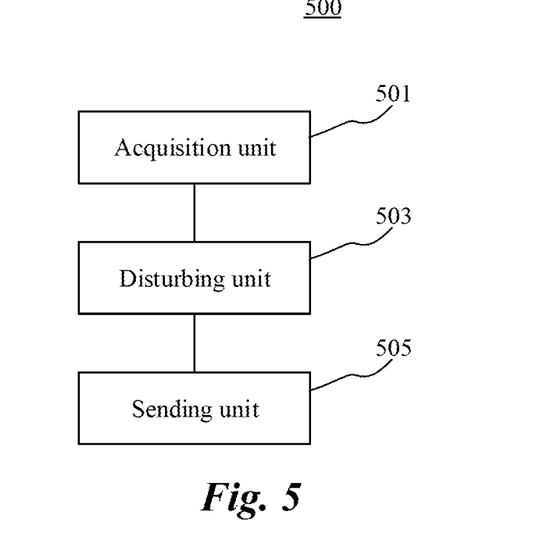
FIG. 5 is a schematic structural diagram illustrating an apparatus for identifying an applet of risky content based on differential privacy preserving according to the present specification.

Further referring to FIG. 5, as an implementation of the methods shown in some figures above, the present specification provides an implementation of an apparatus for identifying an applet of risky content based on differential privacy preserving. The apparatus implementation corresponds to the method implementation shown in FIG. 2, and the apparatus is applicable to the client shown in FIG. 1.

As shown in FIG. 5, an apparatus 500 for identifying an applet of risky content based on differential privacy preserving in this implementation includes an acquisition unit 501, a disturbing unit 503, and a sending unit 505. The acquisition unit 501 is configured to: in response to monitoring a target operation performed by a user by using an applet facilitated by a service platform, obtain a result of determining whether an operation source is a risky operation source, the operation source including a combination of the user and a device used by the user, and the determining result being determined by using a risk identification policy group. The disturbing unit 503 is configured to: in response to determining that the operation source is a risky operation source, disturb a program identifier of the applet by using a randomized response technique that satisfies local differential privacy preserving, to obtain a disturbed program identifier. The sending unit 505 is configured to send an operation source identifier of the operation source and the disturbed program identifier to a serving end of the service platform, so that the serving end identifies whether the applet is an applet of risky content based on multiple received disturbed program identifiers by using the randomized response technique.

In this implementation, for specific processing performed by the acquisition unit 501, the disturbing unit 503, and the sending unit 505 and technical effects brought by the specific processing, references can be respectively made to the related descriptions of step 201, step 203, and step 205 in the implementation corresponding to FIG. 2. Details are omitted herein for simplicity.

In some embodiments, the apparatus 500 can further include a receiving unit (not shown in the figure) configured to receive the risk identification policy group from the serving end.

In some embodiments, the acquisition unit 501 can be further configured to: determine whether the operation source has a risk mark, the risk mark being a mark added in advance for a risky operation source based on the risk identification policy group; and if the operation source has a risk mark, determine that the operation source is a risky operation source.

In some embodiments, the acquisition unit 501 can be further configured to determine whether the operation source is a risky operation source by using the risk identification policy group.

In some embodiments, the acquisition unit 501 can be further configured to: after determining that the operation source is a risky operation source, add a risk mark to the operation source.

In some embodiments, the target operation can include at least one of the following items: an information release operation, an information access operation, etc.

In some embodiments, the operation source identifier can include an account identifier and a device identifier; the risk identification policy group can include at least one of the following policies: a content risk identification policy, a device risk identification policy, and a list policy, the list policy including an account list and/or a device list; the content risk identification policy can be used for risk identification for at least one of the following items: information content related to the target operation in the applet, and historical release data and/or historical access data corresponding to the operation source identifier; the device risk identification policy can be used for risk identification for the device corresponding to the device identifier; and the list policy can be used for risk identification for the device corresponding to the device identifier and/or an account corresponding to the account identifier.

In some embodiments, the content risk identification policy can include a keyword policy and/or a content risk identification model. The keyword policy can include at least one keyword and a risk value respectively corresponding to the at least one keyword. The content risk identification model can be used to identify a risk value corresponding to input content. The device risk identification policy can include at least one device category and a risk value respectively corresponding to the at least one device category. Risk values can be respectively set for the device list and the account list. The device list can include at least one device identifier. The account list can include at least one account identifier.

In some embodiments, the acquisition unit 501 can be further configured to: determine a target risk value corresponding to the operation source by using the risk identification policy group; and if the target risk value exceeds a risk threshold, determine that the operation source is a risky operation source; or if the target risk value does not exceed the risk threshold, determine that the operation source is not a risky operation source.

In some embodiments, the acquisition unit 501 can be further configured to: if the risk identification policy group includes a single risk identification policy, determine the target risk value by using the single risk identification policy; or if the risk identification policy group includes multiple risk identification policies, determine multiple risk values for the operation source by using the multiple risk identification policies, and determine the target risk value based on the multiple risk values.

In some embodiments, the acquisition unit 501 can be further configured to determine an average value or a sum of the multiple risk values as the target risk value.

In some embodiments, weights can be respectively set for the policies in the risk identification policy group; and the acquisition unit 501 can be further configured to: perform weighted summation on the multiple risk values based on the weights of the multiple risk identification policies, and determine a calculated value as the target risk value.

In some embodiments, the acquisition unit 501 can be further configured to: in response to the risk identification policy group including a content risk identification policy, obtain at least one type of the following target data: information content related to the target operation in the applet, and historical release data and/or historical access data corresponding to the operation source identifier; and determine the target risk value based on the target data by using the content risk identification policy.

In some embodiments, the content risk identification policy includes a keyword policy and a content risk identification model, the keyword policy includes at least one keyword and a risk value corresponding to the at least one keyword, and the content risk identification model is used to identify a risk value corresponding to input content; and the acquisition unit 501 can be further configured to: if the target data includes a target keyword that belongs to the at least one keyword, determine the target risk value based on a risk value corresponding to each target keyword; or if the target data does not include the target keyword, identify a risk value corresponding to the target data by using the content risk identification model, and determine the target risk value based on the risk value.

In some embodiments, the operation source identifier includes an account identifier and a device identifier; and the acquisition unit 501 can be further configured to: in response to the risk identification policy group including a list policy, determine whether at least one information item in the operation source identifier is included in the list policy, the list policy including a device list and/or an account list, risk values being respectively set for the device list and the account list, the device list including at least one device identifier, and the account list including at least one account identifier; and in response to determining that the at least one information item is included in the list policy, determine the target risk value based on a risk value corresponding to the at least one information item.

In some embodiments, the disturbing unit 503 can be further configured to: convert the program identifier of the applet into a binary string of a target length; and disturb the binary string based on a disturbing probability by using the randomized response technique.

In some embodiments, the randomized response technique can include any one of the following algorithms: k-RR, RAPPOR, CMS, etc.

According to the apparatus for identifying an applet of risky content based on differential privacy preserving provided in this implementation, in response to monitoring the target operation performed by the user by using the applet facilitated by the service platform, the acquisition unit obtains the result of determining whether the operation source is a risky operation source, the operation source including the combination of the user and the device used by the user, and the determining result being determined by using the risk identification policy group; in response to determining that the operation source is a risky operation source, the disturbing unit disturbs the program identifier of the applet by using the randomized response technique that satisfies local differential privacy preserving, to obtain the disturbed program identifier; and the sending unit sends the operation source identifier of the operation source and the disturbed program identifier to the serving end of the service platform, so that the serving end identifies whether the applet is an applet of risky content based on the multiple received disturbed program identifiers by using the randomized response technique. As such, the client performs local differential privacy preserving processing on the program identifier of the applet accessed by the user, so that the serving end can obtain valid access frequency statistics information, but cannot determine authenticity of each record, thereby effectively identifying an applet of risky content while preserving user's privacy.

Figure 6:
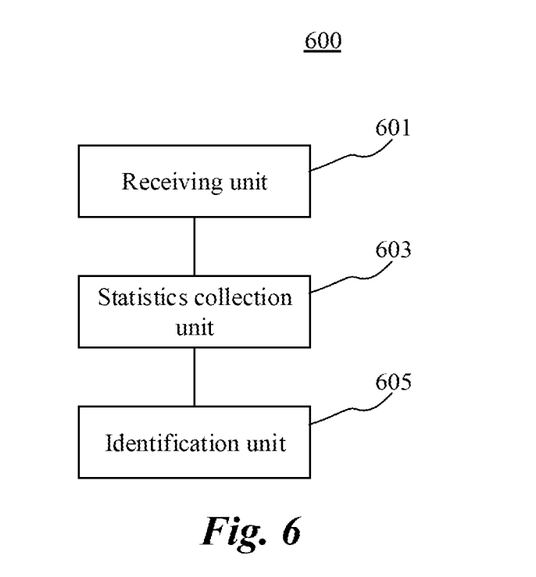
FIG. 6 is another schematic structural diagram illustrating an apparatus for identifying an applet of risky content based on differential privacy preserving according to the present specification.

Further referring to FIG. 6, as an implementation of the methods shown in some figures above, the present specification provides an implementation of an apparatus for identifying an applet of risky content based on differential privacy preserving. The apparatus implementation corresponds to the method implementation shown in FIG. 4, and the apparatus is applicable to the serving end shown in FIG. 1.

As shown in FIG. 6, an apparatus 600 for identifying an applet of risky content based on differential privacy preserving in this implementation includes a receiving unit 601, a statistics collection unit 603, and an identification unit 605. The receiving unit 601 is configured to receive an operation source identifier and a disturbed program identifier that are sent by a client of a service platform, the disturbed program identifier being obtained by disturbing a program identifier of an applet related to the operation source identifier by using a randomized response technique that satisfies local differential privacy preserving in response to an operation source corresponding to the operation source identifier being a risky operation source, the applet belonging to at least one applet facilitated by the service platform. The statistics collection unit 603 is configured to: in response to multiple received disturbed program identifiers satisfying a risk identification condition, collect statistics on access frequency of an applet in the at least one applet based on the multiple disturbed program identifiers by using the randomized response technique, the multiple disturbed program identifiers corresponding to different operation source identifiers. The identification unit 605 is configured to: for an applet in the at least one applet, if access frequency of the applet exceeds a frequency threshold, determine that the applet is an applet of risky content.

In this implementation, for specific processing performed by the receiving unit 601, the statistics collection unit 603, and the identification unit 605 and technical effects brought by the specific processing, references can be respectively made to the related descriptions of step 401, step 403, and step 405 in the implementation corresponding to FIG. 4. Details are omitted herein for simplicity.

In some embodiments, the risk identification condition can include that a quantity of disturbed program identifiers reaches a preset quantity.

In some embodiments, the statistics collection unit 603 can be further configured to: for each of the at least one applet, collect statistics on a visitor quantity of the applet based on the multiple disturbed program identifiers by using the randomized response technique, and determine access frequency of the applet based on a total quantity of the multiple disturbed program identifiers, the visitor quantity, and a disturbing probability.

In some embodiments, the apparatus 600 can further include: an output unit (not shown in the figure), configured to: for each of the at least one applet, after the identification unit 605 determines that the applet is an applet of risky content, output content risk prompt information to a service party to which the applet belongs.

According to the apparatus for identifying an applet of risky content based on differential privacy preserving provided in this implementation, the receiving unit receives the operation source identifier and the disturbed program identifier that are sent by the client of the service platform; and then, in response to the multiple received disturbed program identifiers satisfying the risk identification condition, the statistics collection unit counts access frequency of an applet in the at least one applet based on the multiple disturbed program identifiers by using the randomized response technique, so that the identification unit identifies the applet as an applet of risky content when the access frequency of the applet exceeds the frequency threshold. As such, the client performs local differential privacy preserving processing on the program identifier of the applet accessed by the user, so that the serving end can obtain valid access frequency statistics information, but cannot determine authenticity of each record, thereby effectively identifying an applet of risky content while preserving user's privacy.

An implementation of the present specification further provides a computer readable storage medium. The computer readable storage medium stores a computer program. When the computer program is executed in a computer, the computer is caused to perform the methods for identifying an applet of risky content based on differential privacy preserving respectively shown in the above method implementations.

An implementation of the present specification further provides a computing device, including a memory and a processor. The memory stores executable code. When executing the executable code, the processor implements the methods for identifying an applet of risky content based on differential privacy preserving respectively shown in the above method implementations.

An implementation of the present specification further provides a computer program product. When the computer program product is executed on a data processing device, the data processing device is caused to implement the methods for identifying an applet of risky content based on differential privacy preserving respectively shown in the above method implementations.

A person skilled in the art should be aware that in the above one or more examples, the functions described in the multiple implementations disclosed in the present specification can be implemented by using hardware, software, firmware, or any combination thereof. When the functions are implemented by using software, the functions can be stored in a computer readable medium or transmitted as one or more instructions or code in the computer readable medium.

In some cases, the actions or steps described in the claims can be performed based on sequences different from the sequences in the implementations and can still achieve the desired results. In addition, the process depicted in the accompanying drawings does not necessarily require the shown particular order or sequence to achieve the desired results. In some implementations, multi-task processing and parallel processing can or may be advantageous.

In the above specific implementations, the objectives, technical solutions, and beneficial effects of the multiple implementations disclosed in the present specification are further described in detail. It should be understood that the above descriptions are merely specific implementations of the multiple implementations disclosed in the present specification, but are not intended to limit the protection scope of the multiple implementations disclosed in the present specification. Any modification, equivalent replacement, improvement, etc., made based on the technical solutions in the multiple implementations disclosed in the present specification shall fall within the protection scope of the multiple implementations disclosed in the present specification.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method for identifying an applet of risky content based on differential privacy preserving, the method comprising:
    in response to monitoring, by a client of a service platform, a target operation performed by a user by using an applet of a plurality of applets facilitated by the service platform, determining whether an operation source of the target operation is a risky operation source based, at least in part, on a risk identification policy group including risk identification policies, wherein the operation source is a combination of the user and a device used by the user and wherein the risk identification policy group is updated in real time from a serving end of the service platform;
    in response to determining that the operation source of the target operation is a risky operation source, disturbing a program identifier of the applet by using a randomized response technique that satisfies one or more criteria of local differential privacy preserving based on a disturbing probability, to obtain a disturbed program identifier; and
    sending at least the disturbed program identifier to the serving end of the service platform, wherein the serving end identifies whether the applet is an applet of risky content based on an access frequency of the applet exceeding a threshold, wherein the access frequency of the applet is determined using at least (a) the disturbing probability, (b) a total quantity of a plurality of received disturbed program identifiers, and (c) a quantity of visitors of the applet, by using the randomized response technique.

2. The method according to claim 1, further comprising:
    before responding to the monitoring of the target operation, receiving the risk identification policy group from the serving end.

3. The method according to claim 1, wherein determining whether the operation source is a risky operation source includes:
    determining whether the operation source has a risk mark, the risk mark being a mark added in advance for a risky operation source based, at least in part, on the risk identification policy group; and
    in response to determining that the operation source has the risk mark, determining that the operation source is a risky operation source.

4. The method according to claim 1, further comprising:
    after responding to determining that the operation source is a risky operation source, adding a risk mark to the operation source.

5. The method according to claim 1, wherein the target operation includes at least one of an information release operation or an information access operation.

6. The method according to claim 1, wherein the operation source identifier includes at least one of an account identifier or a device identifier;
    the risk identification policy group includes at least one of a content risk identification policy, a device risk identification policy, or a list policy, the list policy including at least one of an account list or a device list;
    the content risk identification policy is used for risk identification for at least one of (a) information content related to the target operation in the applet or (b) historical data corresponding to the operation source identifier;
    the device risk identification policy is used for risk identification for the device corresponding to the device identifier; and
    the list policy is used for risk identification for the device corresponding to at least one of the device identifier or an account corresponding to the account identifier.

7. The method according to claim 1, wherein determining whether the operation source is a risky operation source includes:
    determining a target risk value corresponding to the operation source by using the risk identification policy group; and performing:
    in response to determining that the target risk value exceeds a risk threshold, determining that the operation source is a risky operation source; or in response to determining that the target risk value does not exceed the risk threshold, determining that the operation source is not a risky operation source.

8. The method according to claim 7, wherein determining the target risk value corresponding to the operation source includes:
in response to determining that the risk identification policy group includes a single risk identification policy, determining the target risk value by using the single risk identification policy; or
in response to determining that the risk identification policy group includes a plurality of risk identification policies, determining a plurality of risk values for the operation source by using the plurality of risk identification policies, and determining the target risk value based on the plurality of risk values.

9. The method according to claim 8, wherein determining the target risk value based on the plurality of risk values includes:
determining at least one of an average value or a sum of the plurality of risk values as the target risk value.

10. The method according to claim 8, wherein individual policies in the risk identification policy group are associated with respective weights, and determining the target risk value based on the plurality of risk values includes:
performing weighted summation on the plurality of risk values based, at least in part, on the weights associated with the policies in the risk identification policy group, and determining the target risk value based, at least in part, on the weighted summation.

11. The method according to claim 7, wherein determining the target risk value corresponding to the operation source includes:
in response to determining that the risk identification policy group includes a content risk identification policy, obtaining at least one of (a) information content related to the target operation in the applet or (b) historical data corresponding to the operation source identifier; and
determining the target risk value based, at least in part, on the target data by using the content risk identification policy.

12. The method according to claim 11, wherein the content risk identification policy includes a keyword policy and a content risk identification model, the keyword policy includes at least one keyword and a risk value corresponding to the at least one keyword, and the content risk identification model is used to identify a risk value corresponding to input content, and wherein determining the target risk value based, at least in part, on the target data includes:
in response to determining that the target data includes a target keyword that matches the at least one keyword, determining the target risk value based, at least in part, on a risk value corresponding to each target keyword; or
in response to determining that the target data does not include the target keyword, identifying a risk value corresponding to the target data by using the content risk identification model, and determining the target risk value based, at least in part, on the risk value.

13. The method according to claim 7, wherein the operation source identifier includes an account identifier and a device identifier, and wherein determining the target risk value corresponding to the operation source includes:
in response to determining that the risk identification policy group including a list policy, determining whether at least one information item in the operation source identifier is included in the list policy, wherein the list policy includes at least one of a device list or an account list, the device list and the account list are associated with respective risk values, the device list includes at least one device identifier, and the account list includes at least one account identifier; and
in response to determining that the at least one information item is included in the list policy, determining the target risk value based, at least in part, on a risk value corresponding to the at least one information item.

14. The method according to claim 1, wherein disturbing the program identifier of the applet includes:
converting the program identifier of the applet into a binary string of a target length; and
disturbing the binary string based, at least in part, on the disturbing probability by using the randomized response technique.

15. The method according to claim 1, wherein the randomized response technique includes at least one of k-Randomized Response (k-RR) algorithm, Randomized Aggregatable Privacy-Preserving Ordinal Response (RAPPOR) algorithm, or Private Count Mean Sketch (CMS) algorithm.

16. A non-transitory computer readable storage medium storing contents that, when executed by one or more processors, cause the one or more processors to perform actions comprising:
in response to monitoring, by a client of a service platform, a target operation performed by a user by using an applet of a plurality of applets facilitated by the service platform, determining whether an operation source of the target operation is a risky operation source based, at least in part, on a risk identification policy group including risk identification policies, wherein the operation source is a combination of the user and a device used by the user and wherein the risk identification policy group is updated in real time from a serving end of the service platform;
in response to determining that the operation source of the target operation is a risky operation source, disturbing a program identifier of the applet by using a randomized response technique that satisfies one or more criteria of local differential privacy preserving based on a disturbing probability, to obtain a disturbed program identifier; and
sending at least the disturbed program identifier to the serving end of the service platform, wherein the serving end identifies whether the applet is an applet of risky content based on an access frequency of the applet exceeding a threshold, wherein the access frequency of the applet is determined using at least (a) the disturbing probability, (b) a total quantity of a plurality of received disturbed program identifiers, and (c) a quantity of visitors of the applet, by using the randomized response technique.

17. A system, comprising:
one or more processors; and
memory storing contents that, when executed by the one or more processors, cause the system to perform actions comprising:
in response to monitoring, by a client of a service platform, a target operation performed by a user by using an applet of a plurality of applets facilitated by the service platform, determining whether an operation source of the target operation is a risky operation source based, at least in part, on a risk identification policy group including risk identification policies, wherein the operation source is a combination of the user and a device used by the user and wherein the risk identification policy group is updated in real time from a serving end of the service platform;

in response to determining that the operation source of the target operation is a risky operation source, disturbing a program identifier of the applet by using a randomized response technique that satisfies one or more criteria of local differential privacy preserving based on a disturbing probability, to obtain a disturbed program identifier; and sending at least the disturbed program identifier to the serving end of the service platform, wherein the serving end identifies whether the applet is an applet of risky content based on an access frequency of the applet exceeding a threshold, wherein the access frequency of the applet is determined using at least (a) the disturbing probability, (b) a total quantity of a plurality of received disturbed program identifiers, and (c) a quantity of visitors of the applet, by using the randomized response technique.

* * * * *